United States Patent [19]

Hiyama et al.

[11] Patent Number: 5,502,123

[45] Date of Patent: Mar. 26, 1996

[54] PROCESS FOR PREPARING VINYL CHLORIDE POLYMER

[75] Inventors: Tadayoshi Hiyama, Ibaraki; Toru Yokota, Chiba; Tadashi Amano, Ibaraki, all of Japan

[73] Assignee: Shin-Etsu Chemical Co., Ltd., Tokyo, Japan

[21] Appl. No.: 288,590

[22] Filed: Aug. 10, 1994

[30] Foreign Application Priority Data

Dec. 21, 1993 [JP] Japan .................................. 5-345209

[51] Int. Cl.$^6$ ........................................................ C08F 2/20
[52] U.S. Cl. ................................................ 526/88; 526/202
[58] Field of Search ..................................... 526/88, 202

[56] References Cited

U.S. PATENT DOCUMENTS

| | | |
|---|---|---|
| 4,324,878 | 4/1982 | Biaggi . |
| 4,849,482 | 7/1989 | Kobayashi .............................. 526/78 |
| 5,096,988 | 3/1992 | Amano . |
| 5,204,421 | 4/1993 | Amano . |
| 5,286,796 | 2/1994 | Amano ................................. 526/200 |
| 5,342,906 | 8/1994 | Amano .................................... 526/88 |

FOREIGN PATENT DOCUMENTS 1495549  2/1969  Germany .

*Primary Examiner*—Christopher Henderson
*Attorney, Agent, or Firm*—McAulay Fisher Nissen Goldberg & Kiel

[57] ABSTRACT

Polyvinyl chloride is prepared by suspension polymerization of a monomeric charge of vinyl chloride dispersed and suspended in an aqueous medium while agitating the suspension. An oil-soluble partially saponified polyvinyl alcohol is added to the monomeric charge as a dispersant at the start of polymerization. A water-soluble partially saponified polyvinyl alcohol and/or a hydroxypropylmethyl cellulose is continuously added as a suspending agent from the start of polymerization. The suspending agent is entirely added while the polymerization rate is in the range of 5–50%. The agitating power applied to the aqueous suspension is 50–110 kg·m/s·ton while the suspending agent is being added, and increased above 110 kg·m/s·ton after the completion of addition. The resulting polymer has a high bulk density and a sharp particle size distribution and is susceptible to extrusion.

12 Claims, No Drawings

PROCESS FOR PREPARING VINYL CHLORIDE POLYMER

BACKGROUND OF THE INVENTION

1. Field of the Invention

This invention relates to a process for preparing by suspension polymerization a vinyl chloride polymer which has a particulate structure with a high bulk density and a high porosity, a sharp particle size distribution, and improved processability and is thus suitable for extrusion molding, injection molding and blow molding.

2. Prior Art

In the recent years, severer requirements are imposed on the quality of vinyl chloride polymers having a low degree of polymerization. Those vinyl chloride polymers intended for use in extrusion molding, injection molding and blow molding are required to have a particulate structure with a high bulk density and a high porosity and a sharp particle size distribution, and be easily processable.

For the manufacture of vinyl chloride polymers, a suspension polymerization method is well known in the art. This method is by suspending and dispersing vinyl chloride monomer in an aqueous medium for polymerization. In particular, vinyl chloride polymers having a high bulk density are manufactured by feeding additional vinyl chloride monomer during polymerization as disclosed in Japanese Patent Application Kokai (JP-A) No. 168008/1984, or using highly saponified polyvinyl alcohol as a dispersant for suspending and dispersing vinyl chloride monomer in an aqueous medium as disclosed in JP-A 7600/1982.

Also various attempts were made for producing vinyl chloride polymers which are easily processable and quickly gelled. For example, JP-A 5866/1977, 15890/1977, 6392/1978, and 112210/1980, and Japanese Patent Publication (JP-B) No. 18562/1986 disclose the preparation of vinyl chloride polymers using as a dispersant an oil-soluble polyvinyl alcohol having a degree of saponification of less than 55% and an average degree of polymerization of less than 600.

The vinyl chloride polymers obtained by these methods, however, have the problem that those polymers having a high bulk density have a slow gelling rate and fail to give acceptable moldings whereas those polymers having a high gelling rate and processability cannot be increased in extrusion molding rate. The prior art methods were difficult to produce a vinyl chloride polymer having a good balance of bulk density and gelling rate.

SUMMARY OF THE INVENTION

Therefore, an object of the present invention is to provide a process for preparing a vinyl chloride polymer having a particulate structure with a high bulk density and a high porosity, a sharp particle size distribution, and improved processability in a stable manner.

Briefly stated, the present invention provides a process for preparing a vinyl chloride polymer by suspension polymerization of monomeric vinyl chloride or a monomeric mixture containing vinyl chloride (to be referred to as a monomeric charge) dispersed and suspended in an aqueous medium while agitating the dispersion in a reactor. (1) A partially saponified polyvinyl alcohol having an average degree of polymerization of 150 to 600 and a degree of saponification of 20 to 55 mol % is added to the monomeric charge as a dispersant in an amount of 0.01 to 5 parts by weight per 100 parts by weight of the monomeric charge prior to the start of polymerization. (2) A suspending agent is added continuously from the start of polymerization and entirely while the polymerization rate is in the range of 5% to 50%. The suspending agent is (A) a water-soluble partially saponified polyvinyl alcohol having an average degree of polymerization of 700 to 3,000 and a degree of saponification of 70 to 85 mol %, (B) a hydroxypropylmethyl cellulose having a degree of methoxy substitution of 26 to 30% by weight, a degree of hydroxypropoxy substitution of 4 to 15% by weight, and a viscosity of 5 to 4,000 centipoise as measured in a 2% by weight aqueous solution at 20° C., or a mixture thereof. The suspending agent is used in an amount of 0.03 to 2 parts by weight per 100 parts by weight of the monomeric charge. (3) The agitating power applied to the aqueous dispersion in the reactor is 50 to 110 kg·m/s·ton while the suspending agent is being added, and increased above 100 kg·m/s·ton after the completion of addition.

According to our finding, the oil-soluble partially saponified polyvinyl alcohol (1) is used as the dispersant at the start of polymerization, which is effective for providing a high porosity. However, the sole use of this dispersant cannot maintain the suspension system stable, resulting in substantial buildup of scale and formation of large particles. Then at the same time as the start of polymerization, the water-soluble suspending agent (2) is continuously added. While this water-soluble suspending agent (2) is being added, the suspension system is agitated relatively weakly. After the completion of addition, the suspension system is vigorously agitated. This maintains the suspension stable and inhibits scale deposition over the entire period of polymerization. There is obtained a vinyl chloride polymer having a particulate structure with a high bulk density and a high porosity, a rapid gelation rate, and improved processability.

DETAILED DESCRIPTION OF THE INVENTION

The present invention provides a process for preparing polyvinyl chloride by suspension polymerization of a monomeric charge containing vinyl chloride dispersed and suspended in an aqueous medium while agitating the dispersion in a reactor. The inventive process is characterized by the use of a specific dispersant and suspending agent. The monomeric charge may be either vinyl chloride alone or a mixture of vinyl chloride and another monomer(s) as will be described later.

According to the invention, an oil-soluble, partially saponified polyvinyl alcohol having an average degree of polymerization of 150 to 600, preferably 150 to 400 and a degree of saponification of 20 to 55 mol %, preferably 40 to 55 mol % is added to the monomeric charge as a dispersant (1) prior to the start of polymerization. With an average degree of polymerization of less than 150 and a degree of saponification of less than 20 mol %, the suspension system becomes unstable, resulting in large particles and scale buildup. An average degree of polymerization of more than 600 and a degree of saponification of more than 55 mol % adversely affect gelation. The partially saponified polyvinyl alcohol (1) is added in an amount of 0.01 to 5 parts, preferably 0.01 to 4 parts, more preferably 0.05 to 2 parts, most preferably 0.05 to 0.1 part by weight per 100 parts by weight of the monomeric charge.

Preferably the oil-soluble, partially saponified polyvinyl alcohol defined herein is used as a sole dispersant before the start of polymerization.

However, the sole use of this oil-soluble, partially saponified polyvinyl alcohol cannot maintain the suspension system stable over the entire period of polymerization. Then addition of a water-soluble suspending agent (2) is commenced at the same time as the start of polymerization, and continuously added thereafter. The water-soluble suspending agent is added at the start of polymerization because if both the dispersant and the suspending agent are admitted prior to the start of polymerization, the suspending agent which tends to protect monomeric droplets can adversely affect gelation by inducing non-uniform dispersion prior to the start of polymerization or increasing the thickness of the resin skin layer. Since liquid droplets tend to agglomerate more with the progress of polymerization, a suspending agent should be accordingly added.

The suspending agent used herein is (A) a water-soluble partially saponified polyvinyl alcohol having an average degree of polymerization of 700 to 3,000, preferably 700 to 2,600 and a degree of saponification of 70 to 85 mol %, preferably 70 to 82 mol %, (B) a hydroxypropylmethyl cellulose having a degree of methoxy substitution of 26 to 30% by weight, preferably 28 to 30% by weight, a degree of hydroxypropoxy substitution of 4 to 15% by weight, 7 to 12% by weight, and a viscosity of 5 to 4,000 centipoise, preferably 5 to 100 centipoise as measured in a 2% by weight aqueous solution at 20°. Suspending agents (A) and (B) may be used alone or in admixture. For combined use, suspending agents (A) and (B) are preferably mixed in a weight ratio of (A)/(B) between 1/0 and 6/4. A less content of (A) in the mixture would render it difficult to control a particle size and to produce a free-flowing polymer.

The suspending agent is used in a (total) amount of 0.03 to 2 parts, preferably 0.04 to 0.09 parts by weight per 100 parts by weight of the monomeric charge. With less than 0.03 part of the suspending agent, more large particles and scale form. With more than 2 parts of the suspending agent, the bulk density does not increase and gelation is adversely affected.

The suspending agent is added continuously from the start of polymerization and the addition is completed while the polymerization rate is in the range of 5 to 50%, preferably 5 to 30%, more preferably 5 to 10%. If the addition of the suspending agent is not started at the start of polymerization, there arise problems of a low bulk density, a wide particle size distribution, poor gelation, and deposition of scale to the reactor to inhibit stable polymerization. If the addition of the suspending agent is continued even after the rate of polymerization exceeds 50%, gelation is adversely affected.

The manner of adding the suspending agent (2) is described in further detail. The time taken until a predetermined polymerization rate is reached is expectable by previously calculating a polymerization rate from the integrated value of heat removal and plotting the polymerization rate as a function of polymerization time to draw a curve. Then if it is desired to continuously add the suspending agent (2) from the start of polymerization to a polymerization rate of 5%, the time (in minute) taken from the start of polymerization to a polymerization rate of 5% is determined from the curve. Provided that the required time is 60 minutes, for example, the entire amount of suspending agent (2) to be added is divided by 60 minutes to calculate the average addition amount per minute. The suspending agent (2) is admitted into the reactor at a rate corresponding to this average addition amount per minute.

During suspension polymerization, the aqueous suspension in the reactor kettle is continuously agitated. According to the present invention, the agitating power applied to the aqueous dispersion in the kettle is 50 to 110 kg·m/s·ton, preferably 80 to 100 kg·m/s·ton while the suspending agent (2) is being added. Outside the range, large particles and scale would form during polymerization.

After the completion of addition of the suspending agent (2), the agitating power applied to the aqueous dispersion in the kettle is increased above 110 kg·m/s·ton, especially to 120 to 150 kg·m/s·ton. The controlled agitation increase the bulk density of the polymer and is advantageous for heat removal. The required agitating power can be calculated by means of a torque meter coupled to the agitating shaft and the number of revolutions.

The monomeric charge may consist of monomeric vinyl chloride. Alternatively the monomeric charge is a mixture of monomeric vinyl chloride and at least one monomer copolymerizable therewith. The mixture preferably contains more than 50% by weight, more preferably more than 80% by weight of monomeric vinyl chloride. Examples of the comonomer used herein include vinyl esters such as vinyl acetate and vinyl propionate; acrylates and methacrylates such as methyl (meth)acrylate and ethyl (meth)acrylate; olefins such as ethylene and propylene; and other monomers copolymerizable with vinyl chloride such as maleic anhydride, acrylonitrile, styrene, and vinylidene chloride. One or more of these comonomers may be used in combination with vinyl chloride.

To the monomeric charge is added a polymerization initiator, which may be selected from conventional ones used for the suspension polymerization of vinyl chloride systems. As the polymerization initiator, preferred are oil-soluble polymerization initiators including peresters such as t-butylperoxyneodecanate, t-butylperoxypivalate, t-hexylperoxyneodecanoate, t-hexylneohexanoate, t-hexylperoxypivalate, $\alpha$-cumylperoxyneodecanate, and 2,4,4-trimethylpentyl- 2-peroxy-2-neodecanate; percarbonates such as diisopropylperoxydicarbonate (IPP), di-2-ethoxyethylperoxydicarbonate, di-2-ethylhexylperoxydicarbonate, dimethoxyisopropylperoxydicarbonate, and diethoxyethylperoxydicarbonate; peroxides such as decanoyl peroxide, benzoyl peroxide, cumenhydroperoxide, cyclohexanone peroxide, 2,4-dichlorobenzoyl peroxide, p-methane hydroperoxide, isobutyryl peroxide, acetylcyclohexylsulfonylperoxide, 2,4,4-trimethylpentyl- 2-peroxyphenoxyacetate, 3,5, 5-trimethylhexanoylperoxide, and lauroyl peroxide; and azo compounds such as $\alpha,\alpha'$-azobisisobutyronitrile, $\alpha,\alpha'$-azobis(2,4-dimethylvaleronitrile), and $\alpha,\alpha'$-azobis(4-methoxy-2,4-dimethylvaleronitrile); alone or in admixture of two or more.

The polymerization initiator may be added to the reaction system while or after a reactor is loaded with water or the monomeric charge. Also the initiator may be added together with the monomeric charge by previously mixing it with the monomeric charge. Alternatively, the initiator may be added to the reaction system by forming an aqueous emulsion with an aqueous medium and pumping the emulsion to the reaction system.

Preferably the initiator is added to the reaction system in an amount of about 0.03 to about 0.5 part by weight per 100 parts by weight of the monomeric charge.

In the practice of the invention, polymerization is preferably carried out at a temperature of about 35° to 70° C. The invention is advantageous especially when polymerization is carried out at a temperature of about 55° to 70° C. because a vinyl chloride polymer having an average degree of polymerization of 400 to 1,000 can be produced. The invention is more advantageous when polymerization is carried out at a temperature of about 58° to 70° C. because a low polymerization degree vinyl chloride polymer having an average degree of polymerization of 400 to 850 can be produced.

In preparing such a low polymerization degree vinyl chloride polymer, a chain transfer agent may be used. Examples of the chain transfer agent include mercaptans such as 2-mercapto- 2-thiazoline and 2-mercaptoethanol and organic phosphorus compounds such as 9,10-dihydro-9-oxa-10-phosphaphenanthrene-10-oxide. While the polymerization rate is in the range of 0 to 30%, the chain transfer agent may be added in an amount of 0.001 to 0.2 part by weight per 100 parts by weight of the monomeric charge.

In the practice of the invention, polymerization conditions other than those specified above may be in accord with conventional ones. Preferably the amount of an aqueous medium used in suspending and dispersing the monomeric charge is selected so as to give a weight ratio of aqueous medium, typically water, to monomer in the range of from 1.0:1 to 1.5:1 at the initial charging as in the conventional method. Additional water may be added during polymerization if desired.

There has been described a process for preparing a vinyl chloride polymer in a stable manner by suspension polymerization, the resulting vinyl chloride polymer having a particulate structure with a high bulk density and a high porosity, a sharp particle size distribution, and improved processability, typically good gelation and high extrusion rate.

EXAMPLE

Examples of the present invention are given below by way of illustration and not by way of limitation.

EXAMPLE 1

An autoclave with an interior volume of 2,000 liters equipped with an agitator and a jacket was charged with 900 kg of deionized water and the dispersant shown in Table 1 in the amount shown in Table 1 and then evacuated by means of a vacuum pump until a vacuum of 60 mmHg was reached. The reactor was then charged with 700 kg of monomeric vinyl chloride. While agitating the contents, hot water was passed through the jacket to start heating of the contents. Then 315 grams of t-butylperoxyneodecanoate was pumped into the reactor under pressure to start polymerization (The polymerization rate was 0% at this point).

At the same time, the suspending agent shown in Table 1 was continuously added while polymerization reaction was continued at a temperature of 63.5° C. More particularly, 5,250 grams of suspending agent (2) and 1,167 grams of suspending agent (3), both defined later, were mixed to form 6,417 grams of a mixture which was continuously added over 30 minutes at a rate of 214 g/min. After 1½ hours from the start of polymerization, 196 grams of 2-mercaptoethanol was pumped as a polymerization degree controlling agent. The agitating power during addition of the suspending agent was as reported in Table 1 and it was changed after the completion of addition as reported in Table 1.

The reaction was terminated at the time when the pressure within the autoclave reached 6.5 kg/cm$^2$G. The unreacted monomer was recovered and the polymer in slurry form was taken out of the autoclave and dried. There was obtained a vinyl chloride polymer having an average degree of polymerization of 650.

The vinyl chloride polymer was measured for bulk density, particle size distribution, plasticizer absorption, gelation, dry flow and extrusion by the following methods. The results are also shown in Table 1.

Bulk Density

It was measured according to JIS K-6721.

Particle Size Distribution

It was measured according to JIS Z-8801.

Average Degree of Polymerization

It was measured according to JIS K-6721.

Plasticizer Absorption

An aluminum alloy container having an inner diameter of 25 mm and a depth of 85 mm was packed with fiber glass on the bottom. The vinyl chloride polymer, 10 grams, was weighed and admitted into the container. Dioctyl phthalate (DOP), 15 cc, was added to the resin which was allowed to stand for 30 minutes, allowing the DOP to fully penetrate into the resin. Thereafter, excess DOP was centrifuged under an acceleration of 1500G. The amount of DOP absorbed in 10 grams of the resin was determined and expressed in gram per 100 grams of the resin.

Preparation of Compound

A compound was prepared by mixing the polyvinyl chloride with ingredients in the following formulation in a 20-liter Henschel mixer.

| Ingredients | Parts by weight |
|---|---|
| PVC | 100 |
| Ca—Zn stabilizer | 0.5 |
| MBS | 8 |
| PE wax | 0.2 |
| Epoxidized soybean oil | 8 |

When the contents in the mixer reached 120° C., the mixer was interrupted. The mixture was allowed to cool down.

Gelation

The compound, 53 grams, was admitted into a Brabender Plastograph® (or Plasti-Corder®) and milled by rotating the rotor at 25 rpm at a jacket temperature of 160° C. The gelation time was the time taken until a maximum torque was reached. The shorter the time, the better is the gelation.

Bulk Density and Dry Flow of Compound

The compound was measured for bulk density according to JIS K-6721.

It was also measured for dry flow by using the bulk density measuring funnel prescribed in JIS K-6721, charging the funnel with 100 cc of the compound, and measuring the time (second) taken until the entire amount of the compound dropped through the funnel.

Extrusion Test

Using a 20 mm single screw extruder, the compound was extruded under the conditions: screw rotation 30 rpm, CR=1.0, cylinder temperature $C_1$=170° C., $C_2$=170° C., $C_3 = 170°$ C., and adapter temperature 185° C. The extrusion rate (g/min.) was measured.

After the completion of extrusion, the screw was withdrawn and visually observed about the progress of gelation. The number of screw pitches from the screw tip over which the compound was gelled was counted. The more the pitch number, the better is the gelation.

EXAMPLES 2–4 & COMPARATIVE EXAMPLES 1–5

Vinyl chloride polymers were prepared by the same procedure as in Example 1 except that the type and addition stage of the dispersant and suspending agent and the agitating power were changed as shown in Table 1. They were similarly measured for physical properties. The results are shown in Table 1.

TABLE 1

|  | Example | | | |
|---|---|---|---|---|
|  | 1 | 2 | 3 | 4 |
| Type and amount of dispersant or suspending agent added before the start of polymerization | dispersant (1) 1634 g | dispersant (1) 1634 g | dispersant (1) 1634 g | dispersant (1) 1634 g |
| Suspending agent added continuously after the start of polymerization | | | | |
| Type and amount | suspending agent (2) 5250 g + supsending agent (3) 1167 g | suspending agent (2) 5250 g + supsending agent (3) 1167 g | suspending agent (2) 8167 g | suspending agent (2) 3500 g + supsending agent (3) 4667 g |
| Addition stage | polymerization rate = 0 to 5% | polymerization rate = 0 to 10% | polymerization rate = 0 to 10% | polymerization rate = 0 to 10% |
| Additon time | 30 min. | 60 min. | 60 min. | 60 min. |
| Additon rate | 213.9 g/min. | 107 g/min. | 136.1 g/min. | 136.1 g/min. |
| Agitating power (continuous addition stage → subsequent stage), kg · m/s · ton | 100→120 | 100→120 | 100→120 | 100→120 |
| Remarks | — | — | — | — |
| Average degree of polymerization | 630 | 630 | 630 | 630 |
| Bulk density | 0.575 | 0.563 | 0.565 | 0.563 |
| Particle size distribution | | | | |
| #60 pass, % | 100 | 100 | 100 | 100 |
| #100 pass, % | 25.0 | 30.1 | 31.2 | 41.8 |
| #200 pass, % | 0.1 | 0.1 | 0.1 | 1.2 |
| Plasticizer absorption | 22.0 | 21.3 | 21.5 | 21.3 |
| Gelation time | 6.2 | 6.9 | 6.7 | 6.9 |
| Compound's bulk density | 0.558 | 0.548 | 0.550 | 0.549 |
| Compound's dry flow | 10.2 | 11.1 | 11.0 | 11.0 |
| Extrusion test | | | | |
| Gelling pitches | 20 | 18 | 18 | 19 |
| Extrusion rate (g/min.) | 45 | 44 | 44 | 45 |

|  | Comparative Example | | | | |
|---|---|---|---|---|---|
|  | 1 | 2 | 3 | 4 | 5 |
| Type and amount of dispersant or suspending agent added before the start of polymerization | dispersant (1) 1634 g + suspending agent (2) 5250 g | dispersant (1) 1634 g | dispersant (1) 1634 g | dispersant (1) 1634 g | dispersant (1) 1634 g |
| Suspending agent added continuously after the start of polymerization | | | | | |
| Type and amount | not continuously added | suspending agent (2) 5250 g + suspending agetn (3) 167 g | suspending agent (4) 8167 g | suspending agent (2) 5250 g + suspending agetn (3) 167 g | suspending agent (2) 5250 g + suspend agetn (3) 167 g |
| Addition stage | — | polymerization rate = 5 to 40% | polymerization rate = 0 to 10% | polymerization rate = 0 to 5% | polymerization rate = 0 to 5% |
| Additon time | — | 130 min. | 60 min. | 60 min. | 60 min. |

TABLE 1-continued

| Additon rate | | 49.4 g/min. | 136.1 g/min. | 213.9 g/min. | 213.9 g/min. |
|---|---|---|---|---|---|
| Agitating power (continuous addition stage → subsequent stage), kg · m/s · ton | 100→120 | 100→120 | 100→120 | 80→80 | 120→120 |
| Remarks | — | scale buildup* | scale buildup* | scale buildup* | scale buildup* |
| Average degree of polymerization | 630 | 630 | 630 | 630 | 630 |
| Bulk density | 0.545 | 0.540 | 0.541 | 0.550 | 0.540 |
| Particle size distribution | | | | | |
| #60 pass, % | 100 | 91.2 | 98.9 | 98.7 | 97.2 |
| #100 pass, % | 40.7 | 64.7 | 52.1 | 16.3 | 58.2 |
| #200 pass, % | 0.9 | 18.5 | 5.8 | 0.0 | 3.8 |
| Plasticizer absorption | 18.5 | 18.4 | 18.9 | 19.5 | 19.9 |
| Gelation time | 10.2 | 11.2 | 10.3 | 9.9 | 9.8 |
| Compound's bulk density | 0.528 | 0.525 | 0.521 | 0.529 | 0.521 |
| Compound's dry flow | 13.0 | 14.5 | 14.2 | 13.1 | 13.9 |
| Extrusion test | | | | | |
| Gelling pitches | 3 | 3 | 3 | 5 | 5 |
| Extrusion rate (g/min.) | 40 | 40 | 40 | 40 | 40 |

*considerable scale buildup on the liquid phase wall near the gas - liquid phase interface of the polymerization kettle Dispersant (1) was an oil-soluble, partially saponified polyvinyl alcohol having a degree of polymerization of 235 and a degree of saponification of 50.7 mol %. It was dissolved in aqueous methanol (water/methanol=1/1 by weight) in a concentration of 30% by weight.

Suspending agent (2) was a water-soluble, partially saponified polyvinyl alcohol having a degree of polymerization of 2550 and a degree of saponification of 80 mol %. It was dissolved in water in a concentration of 6% by weight.

Suspending agent (3) was a hydroxypropylmethyl cellulose having a degree of methoxy substitution of 29.2% by weight, a degree of hydroxypropoxy substitution of 8.9% by weight, and a viscosity of 49.5 centipoise as measured in a 2% by weight aqueous solution at 20° C. It was dissolved in water in a concentration of 3% by weight.

Suspending agent (4) was a water-soluble, partially saponified polyvinyl alcohol having a degree of polymerization of 780 and a degree of saponification of 72.9 mol %. It was dissolved in water in a concentration of 6% by weight.

As is evident from Table 1, the vinyl chloride polymers obtained by the inventive process has a high bulk density, a sharp particle size distribution, an increased plasticizer absorption amount, a short gelation time and acceptable extrudability.

Where the suspending agent was admitted together with the dispersant prior to the start of polymerization (Comparative Example 1), the resulting polymer had a low bulk density, a reduced plasticizer absorption amount, a long gelation time, and a low extrusion rate. Where the suspending agent was not admitted at the initial of polymerization, but after a certain time (Comparative Example 2), where a suspending agent outside the scope of the invention was used (Comparative Example 3), and where the agitating power was outside the scope of the invention (Comparative Examples 4 and 5), the polymerization systems were unstable and the resulting polymers had a low bulk density, a wide particle size distribution, a reduced plasticizer absorption amount, a long gelation time, and a low extrusion rate.

Japanese Patent Application No. 5-345209 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing a vinyl chloride polymer by suspension polymerization of a monomeric charge containing vinyl chloride dispersed and suspended in an aqueous medium while agitating the suspension in a reactor, characterized in that (1) a partially saponified polyvinyl alcohol having an average degree of polymerization of 150 to 600 and a degree of saponification of 20 to 55 mol % is added to the monomeric charge as a dispersant in an amount of 0.01 to 5 parts by weight per 100 parts by weight of the monomeric charge before polymerization is started, (2) a suspending agent selected from the group consisting of (A) a water-soluble partially saponified polyvinyl alcohol having an average degree of polymerization of 700 to 3,000 and a degree of saponification of 70 to 85 mol %, (B) a hydroxypropylmethyl cellulose having a degree of methoxy substitution of 26 to 30% by weight, a degree of hydroxypropoxy substitution of 4 to 15% by weight, and a viscosity of 5 to 4,000 centipoise as measured in a 2% by weight aqueous solution at 20° C., and mixtures thereof is used in an amount of 0.03 to 2 parts by weight per 100 parts by weight of the monomeric charge and added continuously from the start of polymerization and entirely while the polymerization rate is in the range of 5% to 50%, and (3) the agitating power applied to the aqueous suspension in the reactor is 80 to 100 kg·m/s·ton while said suspending agent is being added, and increased above 110 kg·m/s·ton after the completion of addition.

2. The process of claim 1 wherein the partially saponified polyvinyl alcohol has an average degree of polymerization of 150 to 400 and a degree of saponification of 40 to 55 mol %.

3. The process of claim 1 wherein said suspending agents (A) and (B) are mixed in a weight ratio of (A)/(B) between 1/0 and 6/4.

4. The process of claim 1 wherein the suspending agent is used in an amount of 0.04 to 0.09 parts by weight per 100 parts by weight of the monomeric charge.

5. The process of claim 1 wherein the suspending agent is added continuously from the start of polymerization and the addition is completed while the polymerization rate is in the range of 5 to 30%.

6. The process of claim 5 wherein the suspending agent is added continuously from the start of polymerization and the addition is completed while the polymerization rate is in the range of 5 to 10%.

7. The process of claim 1 wherein the suspending agent is admitted into the reactor at a rate corresponding to an average addition amount per minute.

8. The process of claim 1 wherein the agitating power is increased to 120 to 150 kg·m/s·ton after the completion of addition of the suspending agent.

9. The process of claim 1 wherein the monomeric charge contains more then 50% by weight of monomeric vinyl chloride.

10. The process of claim 1 wherein the polymerization is carried out at a temperature of about 55° to 70°.

11. The process of claim 10 wherein the polymerization is carried out at a temperature of about 58° to 70° C. thereby producing a vinyl chloride polymer having an average degree of polymerization of 400 to 850.

12. The process of claim 1 wherein the amount of an aqueous medium used in suspending and dispersing the monomeric charge is selected so as to give a weight ratio of the aqueous medium to the monomeric charge in the range of from 1.0:1 to 1.5:1.

* * * * *